March 18, 1941.     R. E. HOFFMANN     2,235,710
INTERNAL COMBUSTION ENGINE AND METHOD OF OPERATING THE SAME
Filed July 15, 1939
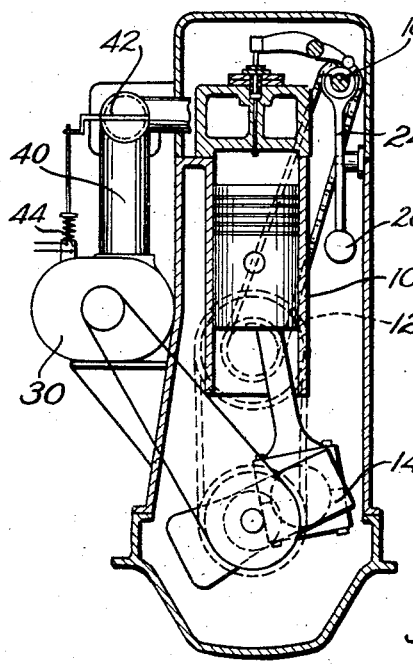
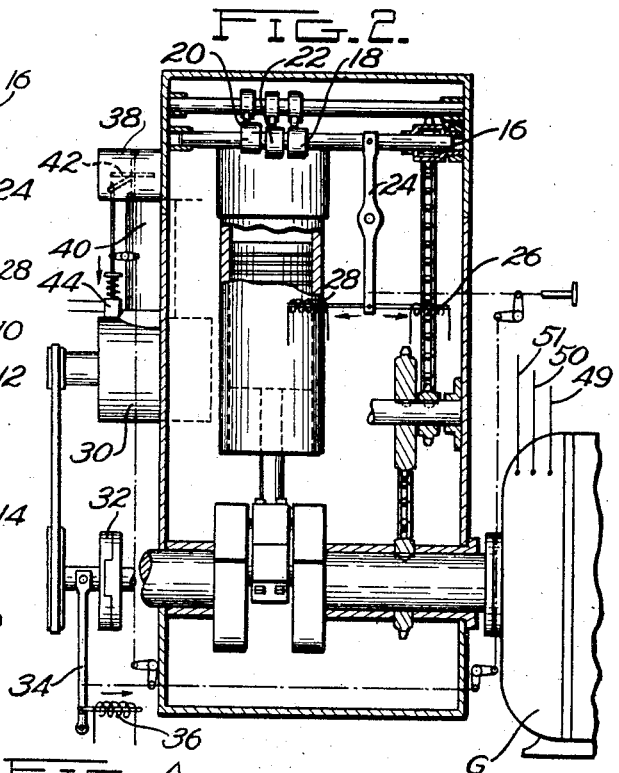
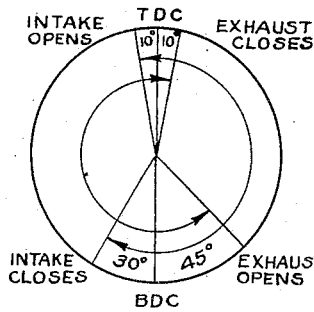
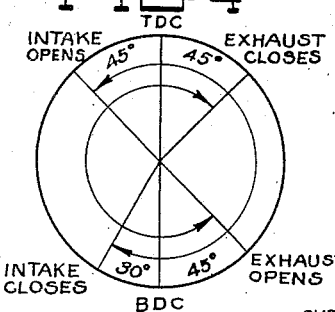
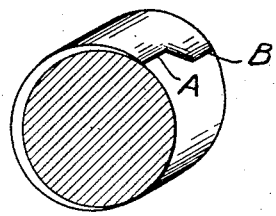
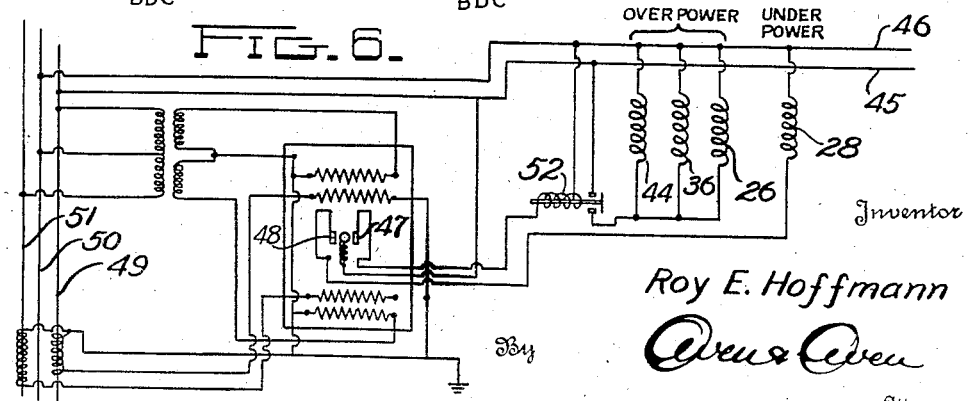
Inventor
Roy E. Hoffmann
By
Attorneys Patented Mar. 18, 1941

2,235,710

UNITED STATES PATENT OFFICE 2,235,710

INTERNAL COMBUSTION ENGINE AND METHOD OF OPERATING THE SAME

Roy E. Hoffmann, Springfield, Ohio, assignor to The National Supply Company, Pittsburgh, Pa., a corporation of Pennsylvania Application July 15, 1939, Serial No. 284,718

3 Claims. (Cl. 123—75)

This invention relates to internal combustion engines and a method of operating the same and is particularly directed to compression ignition engines.

A normally aspirated compression ignition engine shows the best over-all economy when operated at slightly less than its full load and shows poor economy and poor operating characteristics at loads in excess of the rated full load. The same engine, if changed for supercharged operation, that is, with a charging air pressure above atmospheric, is capable of much higher power output than its rated full load under normal aspiration. In some instances an engine may increase its output 50% or more with substantially the same fuel economy and peak cylinder pressures.

The primary object of the present invention is to increase the flexibility of a given engine so as to give efficient operation over a wide load range. The attainment of this object is accomplished by changing the charging air pressure of the engine and, at the same time, changing the valve timing and the timing of fuel injection (in the case of a compression ignition engine) in such a manner that the timing of the various events is made proper for the charging air pressure used.

Other objects and advantages of the invention will become apparent as the description proceeds, reference being had to the accompanying drawing which shows an apparatus suitable for carrying out the method of the present invention and in which—

Figure 1 is a diagrammatic central vertical section representing an engine constructed for supercharged or unsupercharged operation;

Fig. 2 is a central vertical section taken longitudinally of the engine with parts broken away;

Figs. 3 and 4 are valve timing diagrams;

Fig. 5 is a fragmentary representation of a cam, and

Fig. 6 is a circuit diagram which may be utilized in connection with the present invention.

Referring to the drawing, the apparatus may include an engine having a cylinder 10 in which a piston 12 operates, and having the usual crank shaft 14. A cam shaft 16 is provided which may be shifted in the direction of its length and which carries intake and exhaust valve operating cams 18 and 20 and a fuel injection valve operating cam 22. Each of the cams operates a rocker arm in the usual manner the end of which bears against its respective intake, exhaust or fuel injection valve.

As above noted, the cam shaft 16 is shiftable longitudinally by a suitable shifting fork 24 actuated either manually, or by any automatic means such as solenoids 26 and 28, which are adapted to shift the cam shaft in opposite directions. While a shiftable cam shaft is shown in the illustrative apparatus, any suitable means may be used to alter the valve and fuel injection timing of the engine.

A supercharger 30 is provided and may be driven from the crank shaft of the engine through a clutch 32 which is adapted to be engaged or disengaged by a shifting fork 34 actuated in any suitable manner, as by a solenoid 36.

For operation at atmospheric pressure, the air intake of the engine may be through intake conduit 38 and for supercharged operation air is fed to the engine through conduit 40 running from the exhaust side of the supercharger. In this case the end of conduit 38 is cut off by a closure such as a butterfly valve 42 operated by a solenoid 44, or by any other suitable means, so as to prevent leakage of air discharged by the supercharger. Air is supplied to the cylinder in the usual manner on the suction stroke of the piston. When the engine is operating at atmospheric pressure the air is sucked in through conduit 38, through the usual intake valve, and into the cylinder. For supercharged operation, the air is blown under pressure into the cylinder through conduit 40 and through the intake port, the outer end of conduit 38 being closed off by valve 42.

For operation at atmospheric pressure, the valve timing is preferably that shown in Fig. 3 in which the intake valve opens 10° before top dead center and closes 30° after bottom dead center. The exhaust valve opens 45° before bottom dead center and closes 10° after top dead center, giving a valve overlap of 20° for scavenging. For supercharged operation, however, the valve overlap is considerably increased and may be varied through rather wide limits depending upon the characteristics of the engine and the construction of the combustion chamber. For example, the intake valve may be opened 45° before top dead center and closed at 30° after bottom dead center, while the exhaust valve is opened at 45° before bottom dead center and closed at 45° after top dead center, giving a valve overlap of 90°. All of the above angles are, of course, taken on the crank circle of an engine.

In order to accomplish the change in valve timing necessary for the difference between operation at atmospheric pressure and supercharging, any suitable expedient may be used such as a composite cam shown in Fig. 5. The cam there shown diagrammatically represents a cam suitable for operation of the intake valve and the leading edge thereof is stepped so that for normal operation the valve is opened by the portion of the cam adjacent line A and for supercharged operation the cam is shifted longitudinally so that the rocker arm operates on the portion adjacent line B. The direction of movement of the cam is indicated by the arrow. It will thus be seen that an earlier opening of the intake valve is caused by the portion including line B than is caused by the portion including line A.

The method of the present invention includes primarily changing the charging air pressure with a change in the load delivered by the engine. This may be done, in the case of an engine driving an electric generator, by a simple mechanism known commercially as an "over and under-power relay." In the drawing a generator G is diagrammatically shown directly connected to the crank shaft of the engine and driven thereby. Assuming the generator is a three-phase alternating current machine, the connections to the relay are made as indicated in Fig. 6 and a single phase power circuit, including lines 45 and 46, is taken from the generator output and utilized to operate the various solenoids. The relay is provided with an "over-power" contact 47 and an "under-power" contact 48, which are closed in accordance with the load on the generator lines, which latter are designated 49, 50 and 51. When the load reaches a predetermined point, corresponding approximately to the rated full load of the engine when operated at atmospheric pressure of the charging air, the circuit through "over-power" contact 47 is closed and remains closed so long as the load remains above this point. When the load drops below the point for which the relay is set, the circuit through contact 47 is opened and the circuit through "under-power" contact 48 is closed.

Closing of the "over-power" contact 47 closes the circuit to an operating relay 52 which latter closes the circuits through solenoids 26, 36 and 44, which are thus placed in parallel across the operating power lines 45 and 46. Closing of the circuit through solenoid 26 shifts the cam shaft to change the valve and injection timing; closing of the circuit through solenoid 36 closes clutch 32; and closing the circuit through solenoid 44, closes the butterfly valve 42 which controls the intake conduit 38. The engine is then operating under supercharged conditions, since the supercharger 30 is being driven from the crank shaft and the cam shaft is set for the proper valve timing. The solenoids 26, 28, 36 and 44 may all be ordinary attraction type instruments readily available commercially. Thus, current flowing in the windings of the various solenoids causes force to be exerted in the direction of the arrows shown in the drawing adjacent each winding.

When the load on the engine drops to such an extent that operation would be more economical if the engine were again operated at lower charging air pressure, the circuit through "under-power" contact 48 is closed and the circuits through the solenoids previously established are opened by opening the circuit through the operating relay 52. Closing the circuit through "under-power" contact 48 closes the circuit through solenoid 28 and shifts the cam shaft back for normal operation. Clutch 32 and butterfly valve 42 may be spring opened so that the clutch is disengaged and the butterfly valve held in its open position in the absence of current flow in the respective operating solenoids.

The above described apparatus illustrates a device suitable for carrying out the process when used in connection with an engine driving a generator. It will be appreciated that the invention may be applied to engines driving almost any conceivable load which, at intervals, reaches a peak beyond the normal range of the engine so that supercharged operation is desirable during these intervals. Any suitable device may be used to carry out the invention and the change of charging air pressure may be effected gradually or in more than one step, and while it is preferable to effect the change by some kind of automatic control, the change may be effected manually by a skilled operator. For example, a system of levers may be provided to shift the cam shaft to change the valve timing and at the same time throw in the supercharger clutch 32 and close butterfly valve 42. As above noted, the system of levers may be operated either automatically or manually and, if desired, may be related to movements which control the discharge of the fuel pump of the engine.

What I claim as new and desire to secure by United States Letters Patent is:

1. The method of operating a compression ignition engine which includes operating the engine under a normal, low charging air pressure and predetermined valve timing until the power demand on the engine increases to a predetermined point, and then increasing the charging air pressure by supercharging, and adjusting the fuel injection and valve timing to provide for the injection of a greater amount of fuel and an earlier opening of the intake valve and later closing of the exhaust valve, and subsequently returning the engine to the original charging air pressure and valve and injection settings when the power demand decreases below said predetermined point.

2. In an oil engine, a piston, a cylinder provided with intake and exhaust valves and a fuel valve, a set of cams for operating said valves on a four-stroke cycle, a source of compressed air for supercharging the engine for abnormal operation, a second set of cams spaced axially from said first set and operable to increase the period during which both said inlet and exhaust valves are opened simultaneously, means to render one or the other set of said cams active, means to connect said source of compressed air to the engine, said last means being synchronized with said cam shifting means whereby said source of compressed air is connected whenever said second set of cams is made active.

3. The method of operating a compression ignition engine which includes operating the engine under a normal, low charging air pressure and predetermined valve timing until the power demand on the engine increases to a predetermined point, and then increasing the charging air pressure by supercharging, and adjusting the fuel injection and valve timing to provide for the injection of a greater amount of fuel and provide for an increased period during which the intake and exhaust valves are simultaneously open, and subsequently returning the engine to the original charging air pressure and valve and injection settings when the power demand decreases below said predetermined point.

ROY E. HOFFMANN.